Aug. 25, 1964    K. F. EDWARDS ETAL    3,145,815
LATCH OPERATED CLUTCH WITH PUMP
Filed June 11, 1962
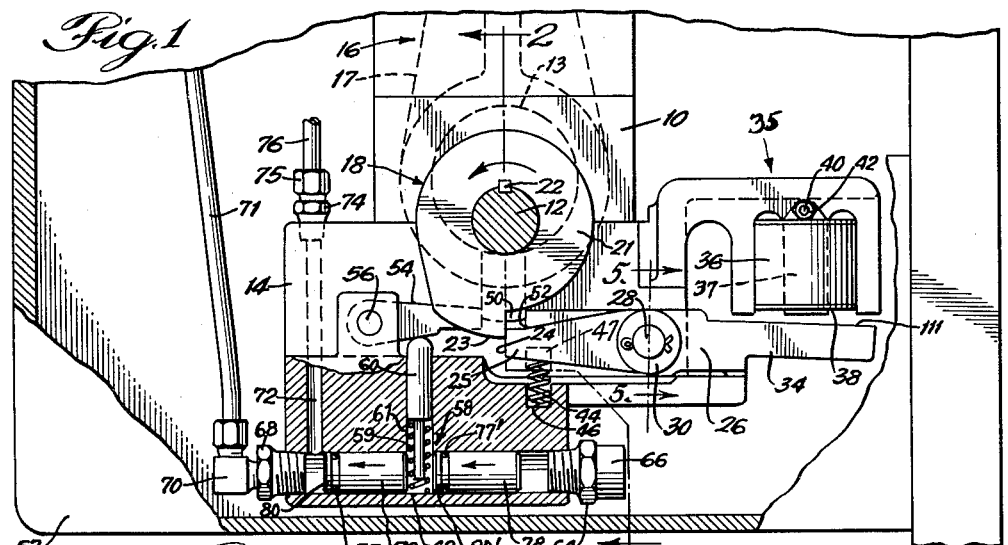
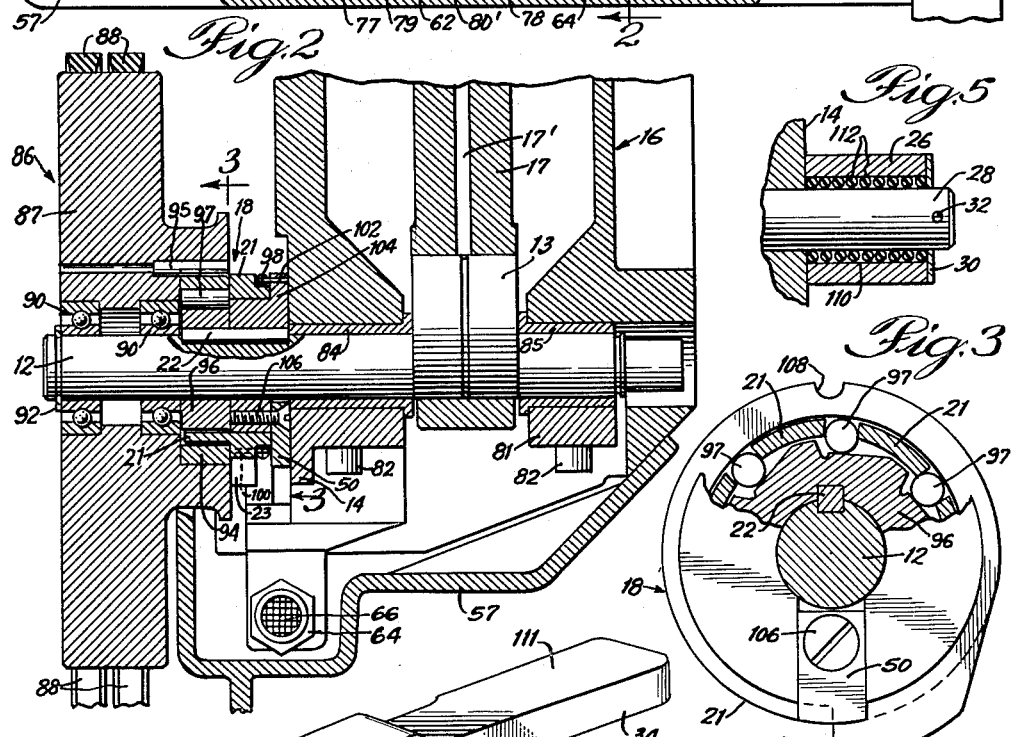
INVENTORS:
Kenneth F. Edwards
& Ralph A. Vogel jr.
BY Bair, Freeman & Molinare
ATTORNEYS.

United States Patent Office 3,145,815
Patented Aug. 25, 1964

3,145,815
LATCH OPERATED CLUTCH WITH PUMP
Kenneth F. Edwards, Lancaster, Ohio, and Ralph A. Vogel, Jr., Fort Wayne, Ind., assignors to Essex Wire Corporation, a corporation of Michigan
Filed June 11, 1962, Ser. No. 201,402
7 Claims. (Cl. 192—27)

This invention relates to apparatus provided with an improved clutch mechanism and more particularly to apparatus having selectively driven means requiring lubrication provided with an improved clutch mechanism having means cooperating with a lubrication pump for lubricating parts of the driven means during each cycle of revolution of the clutch mechanism.

An object of the present invention is to provide apparatus having driven means with a novel clutch mechanism for connecting the driven means to a drive means.

Another object of this invention is to provide apparatus with a clutch mechanism having improved shock absorbing means therein.

Yet another object of this invention is to provide apparatus with a clutch mechanism having improved means for positively positioning the clutch mechanism at the completion of a phase of revolution.

Still another object of this invention is to provide a clutch mechanism with an improved control comprising a clutch lever directly actuated by an electromagnet.

A further object of the present invention is to provide apparatus having a one-revolution type clutch mechanism with lubrication means actuated by the one-revolution clutch mechanism during each cycle of operation. Other objects of the present invention will be readily perceived from the following description.

This invention relates to apparatus having selectively driven means requiring lubrication and to a clutch mechanism for use with such apparatus, the clutch mechanism comprising a race adapted to be connected to drive means, a cam adapted to be connected to the driven means, the race being circumferentially disposed about a portion of the cam, a plurality of rollers, a cage for spacing the rollers between the cam and the race, the cage having an actuating shoulder thereon, a key secured to the cam, a pivoted clutch lever having first and second abutment surfaces on an end thereof, one abutment surface adapted to engage the key and the other adapted to engage the shoulder, and a pivoted backstop lever adapted to engage the key to prevent reverse rotation of the cam, the backstop lever and an abutment surface on the clutch lever cooperating with the key to retain the cam at a predetermined position at the end of a phase of operation; a lubricant reservoir; means communicating the reservoir with the driven means requiring lubrication; and means for pumping lubricant from the reservoir through the communicating means to a point of use comprising a member adapted to be actuated by the backstop lever during a revolution of the driven means, the backstop lever being moved by the key on the cam.

This invention further relates to a clutch mechanism comprising rotatable drive means, rotatable driven means, cam means secured to the driven means, race means secured to the drive means, roller means disposed between the cam means and the race means for operatively engaging the cam means and the race means, cage means for positioning the roller means to selectively engage and disengage the cam means and the race means, spring means for biasing the cage means relative to the race means, clutch lever means for moving the cage means relative to the cam means in opposition to the spring means to disengage the cam means from the race means, the clutch lever means including a pivoted lever and shock absorbers disposed between the lever and the support therefor, the lever having a portion thereof defining an armature, an electromagnet for attracting the armature thereto to pivot the lever, permitting the spring means to cause engagement of the cam means and the race means, and means for repositioning the lever to cause disengagement of the cam means and race means at the end of a phase of operation of the driven means.

The specific structural details and their mode of functioning will be made most manifest, and particularly pointed out in clear, concise and exact terms in conjunction with the accompanying drawing wherein:

FIGURE 1 is an elevation view, partly in section and with parts broken away, illustrating an apparatus embodying the clutch mechanism and the clutch control mechanism of the present invention;

FIGURE 2 is a cross-sectional view of the apparatus taken generally along the line 2—2 of FIGURE 1;

FIGURE 3 is a detail view of the clutch mechanism with parts broken away, taken generally along the line 3—3 of FIGURE 2;

FIGURE 4 is a perspective view of the clutch lever; and

FIGURE 5 is a fragmentary cross-sectional view taken generally along line 5—5 of FIGURE 1, illustrating the clutch lever, the clutch lever shaft and the shock absorber means therebetween.

Referring now to FIGURE 1, there is illustrated an apparatus 9 embodying the present invention. For the purpose of illustration such apparatus has been disclosed as a terminal application press. However, it will be obvious that the other apparatus may be utilized. The apparatus 9 comprises a main support frame 10 upon which is supported driven mechanism including a crankshaft 12. The crankshaft 12, which has an eccentric 13 formed thereon, is journalled in the frame 10 by means including main bearing cap 14.

The crankshaft 12, which is adapted to be driven by suitable drive mechanism, is connected to the connecting rod 17 of the driven means 16 by the clutch mechanism or clutch assembly 18 of the present invention.

Essentially the clutch assembly 18 comprises a drive member, a driven member and intermediate means including rotatable members adapted to move relative to said driven means to engage the rotatable members between the drive member and the driven member. When the driven member and the intermediate means are moved in one direction relative to one another, the drive member is operatively connected to the driven member. When the driven member and the intermediate means are moved in an opposite direction relative to one another, the drive means are disengaged from the driven means.

Rigidly secured to the crankshaft 12 by means of a key 22 is the roller cage 21 of the clutch assembly. Formed on the roller cage 21 is a projection or elevated shoulder 23 which is adapted to engage against an abutment or stop shoulder 24 on an end portion 25 of a clutch lever 26.

The clutch lever 26 is pivotally mounted on a clutch lever shaft 28, which is fixed in the main bearing cap 14. Means including washer 30 and cotter pin 32 are provided for retaining the clutch lever 26 and the O-rings 112 on the shaft 28. The opposite end portion 34 of the clutch lever 26 comprises an armature which is adapted to be engaged by an electromagent 35 comprised of the coil 36 and a core portion 37 of the main bearing cap 14. The coil 36, which is adapted to be connected to a suitable source of electric current, is affixed to the main bearing cap 14 by connecting means comprising a coil retaining clip 38 secured to the main bearing cap 14 by means of a socket head screw 40 and a nut 42 which retains the screw in place. Upon energization of the coil 36, the end 34 of the clutch lever 26 will be drawn into engagement with the electromagnet 35, pivoting the clutch lever 26. The shoulder 24 on the clutch lever 26 will move from engagement with the shoulder 23 of the roller cage 21, permitting rotation of the clutch assembly 18. Upon deenergization of the coil 36 the clutch lever 26 will be pivoted clockwise, as viewed in FIGURE 1, by the spring 44, one end of which is disposed in a bore 46 in the main bearing cap 14 and the other end of which is disposed in a bore 47 in the end 25 of the clutch lever 26.

Also forming a part of and being affixed to the clutch assembly 18 is a key 50. The key 50 is adapted to engage a second abutment or shoulder 52 on the end portion 25 of the clutch lever 26. Initially, the key 50 is retained between the shoulder 52 on the clutch lever 26 and the free end of the backstop lever 54. As the clutch lever 26 pivots counterclockwise as viewed in FIGURE 1, simultaneously releasing the shoulder 23 and the key 50 from the abutment surfaces on the end 25 of the clutch lever 26, the clutch assembly 18 will be engaged and will commence to drive driven means 16. At the completion of a cycle of revolution, the key 50 will engage shoulder 52 at the same time that shoulder 23 on the roller cage 21 engages the abutment 24, causing disengagement of the clutch assembly 18 in a manner more fully described hereinafter. The key 50 is positively retained between the shoulder 52 on the clutch lever 25 and the free end of backstop lever 54.

As the clutch assembly nears the end of a cycle of revolution, the key 50 will engage the backstop lever 54 pivotally secured on the dowel pin 56. Actuation of the backstop lever 54 will cause actuation of the lubricating means 58 drawing lubricant from the oil pan 57, defining a reservoir beneath the crankshaft 12, and forcing it to the points of use in the apparatus 9 requiring lubrication.

The lubricating means comprise a piston 60 movable in a vertical bore 61 in the main bearing cap 14 in response to engagement and actuation by the backstop lever 54. The piston 60 is moved in the bore 61 against the bias of spring 59. If desired, the piston 60 may be provided with annular grooves within which O-rings may be placed, to prevent leakage of oil past the piston. Extending horizontally through the main bearing cap 14, there is a passage 62. Secured at the inlet to the passage 62 is a bushing 64, which has an oil pump screen 66 connected thereto. Within the outlet end of the passage 62 there is provided a reducing bushing 68 to which is connected a fitting 70. Suitable tubing 71 is connected to the fitting 70 for conducting the oil to desired points of use. Also provided in the main bearing cap 14 is a vertical passage 72. A reducing bushing 74 is connected at the outlet of the vertical passage 72. Fitting 75 is secured at one end to the reducing bushing 74 and at the other end to tubing 76 for conducting lubricant to other points of use.

Within the horizontal passage 62 in the main bearing cap 14 are provided a pair of cartridge-type check valves 78 and 79. The check valves 78 and 79 are maintained in place by means including O-rings 77 and 77' and retainers 80 and 80'.

Considering now FIGURE 2, there is shown a cross-sectional view of the apparatus 9 taken generally along the lines 2—2 of FIGURE 1. The means journalling the crankshaft 12 in the apparatus 9 include the main bearing cap 14, which is secured to the frame 10 by machine screws 82, and end cap 81, which is secured to the frame 10 by means of similar screws 82. Suitable bearings or bushings 84 and 85 are provided between the main bearing cap 14 and the end cap 81, respectively, and the crankshaft 12.

The drive means may comprise a flywheel or pulley 87 connected to a source of power (not shown) by suitable belts 88. The pulley 87 is freely supported on the crankshaft through the bearings 90. The free end of the crankshaft 12 has a retaining ring 92 thereon for securing the bearings 90 and flywheel 87 to the crankshaft 12.

The structural association between the components of the clutch assembly 18 can be more clearly seen in FIGURE 2. Supported between a race 94, which is adapted to be fixedly secured to the pulley 87 for rotation therewith by a dowel pin 95, and a cam 96, connected to the crankshaft 12 for rotation therewith by the key 22, are a plurality of rollers 97. Also keyed to the shaft 12 for rotation therewith is a filling collar 104. Concentrically disposed about the filling collar 104 and extending into the space between the cam and the race is a roller cage 21. The spring 98, which is adapted to be connected at one end in a recess 100 in the roller cage 21 and at the other end in a recess 102 in the filling collar 104, is provided to effectuate relative movement between the filling collar and the roller cage. It will be understood that upon release of the shoulder 23 on the roller cage 21 from engagement with the shoulder 24 on the clutch lever 26, the spring 98 will urge the filling collar 104 to move relative to the roller cage 21, causing the engagement between the cam 96, the race 94 and the rollers 97 therebetween, thus providing engagement between the drive means and the driven means. Upon engagement of the shoulder 23 with the shoulder 24 at the end of a cycle of revolution the roller cage 21 will move relative to the cam 96, causing disengagement of the driven means from the drive means. The key 50 is fixedly secured to the rear face of the filling collar 104 by means of the key screw 106.

Referring now to FIGURE 3, there is shown an enlarged view of the clutch mechanism taken generally along the line 3—3 of FIGURE 2. A portion of the filling collar 104 has been broken away to more clearly illustrate the cooperative relationship between the cam 96, the rollers 97, the roller cage 21, and the race 94. It will be noted that a recess 108 is provided in the race 94 for reception of a dowel pin 95 to secure the race 94 to the pulley 87.

Referring now to FIGURE 4, there is shown a perspective view of the clutch lever 26. On the end 25 of the clutch lever 26 there are provided a major abutment 24 adapted to engage the shoulder 23 on the roller cage 21 and a minor abutment 52 adapted to engage a side of the key 50. On the end 34 of the clutch lever 26 there is provided a flattened surface adapted to be attracted to the electromagnet 35. The surface 111 may be brass brazed and then machined to provide a suitable surface for magnetization. It has been found desirable to machine a number of small grooves across surface 111 to obtain fast release of the armature.

In FIGURE 5 there is illustrated a cross-sectional view of the clutch lever and clutch lever shaft taken generally along the line 5—5 of FIGURE 1. The shock absorber means of the present invention include a plurality of O-rings disposed about the shaft 28. These O-rings are for the purpose of minimizing shock and damage to the components when the shoulder 23 and the key 50 engage the abutment 24 and 52 of the clutch lever 26. In a presently preferred form of the invention, nine O-rings are provided on the shaft 28 between the shaft and the bore in the clutch lever 26.

*Operation*

Normally, power will be continuously supplied to the flywheel or pulley 87 through the belt 88. The clutch assembly 18 will be disengaged so that the driven means are inoperative. When it is desired to operate the connecting rod 17 of the driven means, a suitable control (not shown) is actuated to energize the coil 36 of electromagnet 35 for a short interval of time. It is important that the control provide energization of coil 36 for a time period considerably less than the time required for a single revolution of the clutch. The control preferably is a condenser-discharge type power supply but a momentary-type switch could also be used.

Upon energization of coil 36 the armature or end 34 of clutch lever 26 will be attracted to the electromagnet 35, thus pivoting the clutch lever 26 counterclockwise about the shaft 28 (as viewed in FIGURE 1). The shoulder 23 of the roller cage 21 will be released from engagement with the abutment 24 on the end 25 of the clutch lever 26, thus permitting the spring 98 to move the roller cage 21 relative to the cam 96 and the filling collar 104, causing engagement of the crankshaft 12 with the drive means 86. Because of the relative movement between the roller cage 21 and cam 96 the rollers 97 bind between the cam 96 and the race 94, causing the cam to be driven in response to rotation of the race, which is affixed to pulley 87. Rotation of the cam 96 causes rotation of the crankshaft 12, as the cam 96 is rigidly secured to the crankshaft 12 by the key 22.

Simultaneously with the release of shoulder 23 from abutment 24, the key 50 is released from abutment 52 on clutch lever 26.

Immediately upon deenergization of the coil 36, the clutch lever 26 is returned to its initial position by means of the spring 44.

As the clutch assembly 18 completes about seven-eighths of a revolution, the key 50 thereon engages the backstop lever 54 causing the lever 54 to pivot about dowel pin 56. Movement of the backstop lever 54 causes the piston 60 to move downwardly against the bias of spring 59. A charge of oil trapped in passageway 62 between the cartridge check valves 78 and 79 will be forced through the check valve 79 into the tubings 71 and 76 for transfer to points of use requiring lubrication. One such point of use is illustrated by the passage 17′ in the connecting rod 17 which communicates with a passage in the eccentric 13 of the crankshaft permitting lubrication of the surface of the eccentric between the eccentric and the connecting rod 17.

When the shoulder 23 engages the abutment 24 and the key 50 engagtes the abutment 52 at the completion of a cycle of revolution, the roller cage 21 is caused to move relative to the cam 96 and the filling collar 104, resulting in movement of the rollers 97 with respect to the cam 96 and disengagement of the cam 96 from the race 94. In this manner the clutch assembly 18 is disengaged at the end of a phase of operation.

It will be noted that the clutch assembly 18 is retained in a predetermined position at the end of a phase of operation by the cooperation of the key 50 secured to the filling collar 104 with the free end of the backstop lever 54 and the minor abutment 52 on the clutch lever 26.

The O-rings 112, which in a preferred embodiment of the invention are nine in number, serve as shock absorbers to minimize the impact when the shoulder 23 and the key 50 abut the abutments 24 and 52 on clutch lever 26.

It should be noted that the present invention is not limited to a one-revolution clutch mechanism, but depending upon the length of energization of the coil 36, the clutch could have an operating cycle of two or more revolutions.

By means of the present invention there has been provided apparatus having improved clutch mechanism incorporating a clutch lever directly actuated by an electromagnet for engaging the clutch mechanism, means for positively positioning the clutch mechanism at the end of a cycle of operation, and shock absorber means for minimizing the impact when the clutch assembly is disengaged. In addition, apparatus has been provided with novel clutch mechanism adapted to actuate a lubrication means for suitably forcing a charge of lubricant to desired points of use at a predetermined time during each cycle of clutch mechanism operation.

It will be apparent to those persons having skill in the art that the clutch assembly and lubrication means of the present invention may be utilized for apparatus other than the terminal press disclosed in the present application. The above disclosure has been given by way of illustration and elucidation and not by way of limitation, and it is desired to protect all embodiments of the herein disclosed inventive concept within the scope of the appended claims.

What is claimed as the invention is:

1. In combination with apparatus having selectively driven means requiring lubrication, a clutch mechanism comprising a race adapted to be connected to drive means, cam means adapted to be connected to said driven means, said race being circumferentially disposed about a portion of said cam means, a plurality of rollers, a cage for spacing the rollers between the cam means and the race, said cage having an actuating shoulder thereon, a key secured to said cam means, a pivoted clutch lever having first and second abutment surfaces on an end thereof, said first abutment surface adapted to engage said key and said second abutment surface adapted to engage said shoulder, and a pivoted backstop lever adapted to engage said key to prevent reverse rotation of said cam means, said backstop lever and an abutment surface on said clutch lever cooperating with said key to retain said cam means at a predetermined position at the end of a phase of operation; a lubricant reservoir; means communicating said reservoir with the driven means requiring lubrication; and means for pumping lubricant from said reservoir through said communicating means to a point of use comprising a member positioned for actuation by said backstop lever during rotation of said driven means, said backstop lever being moved by said key on said cam means, said member being biased against said backstop lever, whereby the backstop lever is biased toward a position for cooperation with the key on said cam means.

2. Apparatus as in claim 1 wherein said cam means comprises a cam and a filling collar, each fixedly secured to the driven means for rotation therewith.

3. Apparatus as in claim 1 wherein a portion of said clutch lever is made from a magnetizable material and is constructed and arranged to function as an armature and an electromagnet for actuating said armature, whereby upon energization of said electromagnet, the clutch lever is pivoted to release the shoulder, permitting clutching, and driving of the driven means.

4. Apparatus as in claim 3 including biasing means for positioning said clutch lever so that at the end of a cycle of operation, the shoulder on the cage engages the second abutment surface on the clutch lever, permitting declutching, and stopping of the driven means.

5. In a clutch mechanism, a shaft member to be driven, cam means secured to said shaft member, a race circumferentially disposed about a portion of said cam means, said race adapted to be secured to a drive mechanism, rotatable elements, a cage for spacing the rotatable elements between the cam means and the race, spring means for biasing the cage relative to the cam means for engaging the clutch mechanism, said cage having an actuating shoulder thereon, a key secured to said cam means, support means, a clutch lever pivotally mounted on said support means, an electromagnet, said clutch lever having one end movable in response to actuation of the electromagnet for pivoting the clutch lever in one direction and having abutment surfaces on the other end thereof for engaging said key and said actuating shoulder on said cage, means for biasing said clutch lever in opposition to the force of the electromagnet, and a backstop lever adapted to engage said key to prevent reverse rotation of said cam means, said backstop lever and an abutment surface on said clutch lever cooperating with said key on said cam means to retain said cam means therebetween at a predetermined position at the end of a phase of operation, whereby upon energization of said electromagnet, said clutch lever is pivoted to release said shoulder and said key from engagement with the abutment surfaces on said clutch lever, permitting the biasing means to rotate the cage relative to the cam means, causing operative engagement between the cam means, rollers and race, thereby driving the shaft member, and, at the completion of a phase of operation, said actuating shoulder of said cage engages an abutment surface on the clutch lever, causing relative rotation between the cam means and the cage to disengage the cam means, rollers and race, terminating rotation of the shaft member, said clutch lever being pivoted on a shaft mounted on the frame means and a plurality of O-rings being provided on the shaft between the shaft and the clutch lever to absorb the shock when the actuating shoulder on the cage engages an abutment surface on the clutch lever.

6. A clutch mechanism as in claim 5 wherein said one end of said clutch lever is made at least in part from a magnetizable material, said one end of said clutch lever forming an armature and being attracted to the electromagnet upon energization thereof.

7. In a clutch mechanism, the combination of a rotatable drive means, rotatable driven means, cam means secured to said driven means for rotation therewith, race means secured to said drive means for rotation therewith, roller means disposed between said cam means and said race means for operatively engaging said cam means and said race means, cage means movably mounted with respect to said cam means for positioning said roller means to selectively engage and disengage said cam means and said race means, spring means for biasing said cage means relative to said cam means to engage said cam means and said race means, clutch lever means for moving said cage means relative to said cam means in opposition to the spring means to disengage said cam means from said race means, said clutch lever means including a pivoted lever carried on a shaft and annular ring-like resilient shock absorbers disposed on said shaft between the lever and the shaft, said lever having a portion thereof defining an armature, an electromagnet adapted to be intermittently energized for attracting the armature thereto to move the lever, permitting the spring means to cause engagement of the cam means and the race means, and means for repositioning the lever to cause disengagement of the cam means and the race means at the end of a phase of operation of the driven means.

References Cited in the file of this patent
UNITED STATES PATENTS

| | | |
|---|---|---|
| 770,666 | Walsh | Sept. 20, 1904 |
| 1,429,404 | Card | Sept. 19, 1922 |
| 1,913,898 | Quaba | June 13, 1933 |
| 2,089,846 | Finch | Aug. 10, 1937 |
| 2,182,821 | Robinson | Dec. 12, 1939 |
| 2,856,024 | Thomas | Oct. 14, 1958 |
| 2,990,043 | Fink | June 27, 1961 |

FOREIGN PATENTS

| | | |
|---|---|---|
| 705,234 | France | Mar. 3, 1931 |